United States Patent
Kaluza et al.

(10) Patent No.: US 10,691,522 B2
(45) Date of Patent: Jun. 23, 2020

(54) SYSTEM AND METHOD FOR INCIDENT ROOT CAUSE ANALYSIS

(71) Applicant: E.S.I. SOFTWARE LTD, Rosh Ha'Ayin (IL)

(72) Inventors: Bostjan Kaluza, Ljubljana (SI); Eyal Oz, Petach-Tikva (IL); Alexander Gilenson, Givatayim (IL)

(73) Assignee: E.S.I. SOFTWARE LTD, Rosh Haayin (IL)

( * ) Notice: Subject to any disclaimer, the term of this patent is extended or adjusted under 35 U.S.C. 154(b) by 938 days.

(21) Appl. No.: 15/004,954

(22) Filed: Jan. 24, 2016

(65) Prior Publication Data
US 2017/0213142 A1    Jul. 27, 2017

(51) Int. Cl.
| | |
|---|---|
| *G06F 11/07* | (2006.01) |
| *G06N 5/02* | (2006.01) |
| *G06F 11/34* | (2006.01) |
| *G06F 11/32* | (2006.01) |

(52) U.S. Cl.
CPC .............. *G06F 11/079* (2013.01); *G06N 5/02* (2013.01); *G06F 11/323* (2013.01); *G06F 11/3409* (2013.01); *G06F 11/3419* (2013.01); *G06F 11/3495* (2013.01)

(58) Field of Classification Search
CPC .......... G06N 5/02; G06N 5/04; G06N 99/005; G06N 20/00
See application file for complete search history.

(56) References Cited

U.S. PATENT DOCUMENTS

| | | | |
|---|---|---|---|
| 6,829,734 B1 | 12/2004 | Kreulen et al. | |
| 7,203,624 B2 | 4/2007 | Warshawsky | |
| 7,266,734 B2 | 9/2007 | Chavez, Jr. et al. | |
| 7,904,319 B1* | 3/2011 | Whear | G06Q 40/08 705/4 |
| 8,301,613 B2 | 10/2012 | Grabarnik et al. | |
| 2004/0260678 A1 | 12/2004 | Verbowski et al. | |
| 2006/0112135 A1* | 5/2006 | Warshawsky | G06F 11/3452 |
| 2008/0208888 A1* | 8/2008 | Mitchell | G06F 16/2477 |
| 2010/0274596 A1* | 10/2010 | Grace | G06Q 10/06311 705/7.15 |
| 2016/0246662 A1* | 8/2016 | Meng | G06F 11/079 |

\* cited by examiner

*Primary Examiner* — Eric Nilsson
(74) *Attorney, Agent, or Firm* — Soroker Agmon Nordman

(57) ABSTRACT

A method of incident root cause analysis in an information technology (IT) system, wherein upon occurrence of an incident collecting changes to configuration items and/or system parameters on computer stations during a predetermined time prior to the incident, calculating a change lifetime for each of the collected changes, comparing the change lifetime to the time of occurrence of the incident to determine if the lifetime of the change is still valid, marking a probability value of zero for occurrence of the incident as a result of the change for changes with an expired lifetime value at the time of the incident, otherwise estimating a risk profile and calculating from it a probability value for occurrence of the incident as a result of the change, sorting the changes according to the probability value, and selecting a predetermined number of changes having the highest probability values for root cause analysis.

19 Claims, 4 Drawing Sheets

SYSTEM AND METHOD FOR INCIDENT ROOT CAUSE ANALYSIS

TECHNICAL FIELD

The present disclosure relates generally to information technology (IT) systems and more particularly to incident remediation through root cause analysis of correlated data sources.

BACKGROUND

In the past decades information technology (IT) systems have evolved and increased in complexity. In the past a company would use a single computer with a single operating system and small number of programs to supply the computational needs of the company. Nowadays enterprise companies may have hundreds and thousands of computers interconnected over a network. The company may use multiple servers and multiple databases to service hundreds and thousands of computers connected to them. Essentially each layer of the IT system has evolved and become more complex to control and manage. In some cases multiple servers may be installed with identical software and load balancers may be used to regulate access to the servers. An average business system includes tens or hundreds of thousands of configuration parameters. For example Windows OS contains between 1,500 to 2,500 configuration parameters. IBM WebSphere Application Server has about 16,000, and Oracle Weblogic more than 60,000. If any of these parameters are misconfigured or omitted the change may impact proper operations of the IT system.

The dependence of IT systems on the configuration can have serious consequences, for example in April 2011 Amazon Web Services suffered a devastating event that knocked offline some of their clients for as much as four days. It turned out that a network configuration error made during a network upgrade caused the problem. In the past upgrades were rare and applied slowly to the client servers. Nowadays especially with the help of the Internet upgrades for some software packages may be released on a daily basis and even automatically applied. If a problem arises in response to an upgrade most systems are incapable of presenting an administrator with a list of changes let alone suggest what changes are the most probable cause of the problem.

It is thus desirable to improve the ability to avoid problems in IT system updates and day-to-day operation and to reduce the mean time to resolution (MTTR) for handling problems that still occur in the IT systems. The prevention of problems and reduction of the MTTR can help to prevent economic damage to the organization.

A few companies have developed software products that help system administrators to keep track of changes to computer configurations. These products detect granular changes to configuration items (CI). Typically such products collect and store the configuration items (CI) in a configuration management database (CMDB) so that the current value of a configuration item may be compared to prior values or to similar machines. The products may also bundle configuration items into composite CI's to enable easier visualization of the CI's, for example by grouping them by their type or content. Once the configuration items are collected an IT user (e.g. engineer, system administrator) may need to analyze hundreds, thousands or millions of granular changes or groups of changes to detect the source of a problem.

Some software packages record periodic snapshots of a computer or group of computers in the IT system so that in case of an application failure the current state may be compared with prior states to locate changes that may be the cause of failure. This method can reduce the number of changes that need to be checked (e.g. from a few specific generations of change). However it provides little help in pinpointing the change that is the root cause of the failure.

SUMMARY

An aspect of an embodiment of the disclosure relates to a system and method for locating a root cause for incidents in an information technology system. The system collects configuration items and other system parameters, then identifies changes over time in these items. When an incident occurs the system collects changes from a predetermined time prior to the incident for analysis. For each change the system determines a lifetime value representing the time that the change could have an effect on the system and be the cause of the incident. Some changes can affect the system indefinitely and some changes may be limited to affect the system only for a specific time, for example a day or two, whereas after that the incident is clearly not the result of that change. For each change the system aims to set a probability value indicating a how likely that change is to have influenced the incident. Changes with a lifetime that expired are given a probability of zero. The other changes are examined based on their characteristics to form a risk profile that can be used to calculate a probability value. After determining the probability values the changes are sorted based on the probability value so that the changes with the highest probability may be selected and examined to determine their relevance to the incident.

In an exemplary embodiment of the disclosure, an incident may include high CPU usage, high memory usage, system errors, a program crash, deteriorating response time of an application or transaction in the system and/or other system problems.

In an exemplary embodiment of the disclosure, the risk profile may be based on empiric data, domain specific knowledge, the type of change, the expected time for an incident to occur in response to the change, the number of changes per incident being handled, the number of IT actions that led to the changes or other information.

There is thus provided according to an exemplary embodiment of the disclosure, a method of incident root cause analysis in an information technology (IT) system, comprising:

upon occurrence of an incident in the information technology system collecting changes to configuration items and/or system parameters on computer stations in the information technology system during a predetermined time prior to the incident;

Calculating a change lifetime for each of the collected changes;

Comparing the change lifetime to the time of occurrence of the incident to determine if the lifetime of the change is still valid or has expired;

Marking a probability value of zero for occurrence of the incident as a result of the change for changes with an expired lifetime value at the time of occurrence of the incident;

Estimating a risk profile and calculating from it a probability value for occurrence of the incident as a result of the change for changes with a lifetime value that is still valid at the time of the incident;

Sorting the changes according to the probability value;

Selecting a predetermined number of changes having the highest probability values for root cause analysis.

In an exemplary embodiment of the disclosure, key performance indicators in the information technology system are monitored by agents installed on computer stations of the system to trigger an incident. Optionally, the key performance indicators include parameters selected from the group consisting of unusually high CPU usage, low available working memory, disk space, transaction slowdowns or errors, network congestion, and slow response time for specific applications. In an exemplary embodiment of the disclosure, changes are collected continuously from computer stations of the system and stored in a database. Optionally, the risk profile is estimated based on a ratio of incidents per number of changes performed. Alternatively or additionally, the risk profile is estimated based on a ratio of incidents per number of changes performed for an IT action comprising a group of configuration items and/or system parameters that were changed together. Further alternatively or additionally, the risk profile is estimated based on a type of the configuration item and/or system parameters that changed or based on multi-dimensional risk analysis using change properties such as frequency of change, if change was authorized, or if the change is consistent across different environments. Further alternatively or additionally, the risk profile is estimated based on an incident rate distribution that defines a probability as a function of time for the occurrence of an incident due to the changed configuration item and/or system parameter. In an exemplary embodiment of the disclosure, a Weibull distribution is used for the probability function. Optionally, the probability function is integrated from the time of the change to the time of the incident.

There is further provided according to an exemplary embodiment of the disclosure, a system for incident root cause analysis in an information technology (IT) system, comprising:

A database for storing changes to configuration items and/or system parameters;

A computer having a processor and memory serving as an analysis server;

An analysis program executed by the analysis server computer;

Wherein upon occurrence of an incident in the information technology system the analysis program is programmed to perform the following:

Collecting changes to configuration items and/or system parameters on computer stations in the information technology system during a predetermined time prior to the incident;

Calculating a change lifetime for each of the collected changes;

Comparing the change lifetime to the time of occurrence of the incident to determine if the lifetime of the change is still valid or has expired;

Marking a probability value of zero for occurrence of the incident as a result of the change for changes with an expired lifetime value at the time of the incident;

Estimating a risk profile and calculating from it a probability value for occurrence of the incident as a result of the change for changes with a lifetime value that is still valid at the time of the incident;

Sorting the changes according to the probability value;

Selecting a predetermined number of changes having the highest probability values for root cause analysis.

In an exemplary embodiment of the disclosure, key performance indicators in the information technology system are monitored by agents installed on computer stations of the system to trigger an incident alert. Optionally, the key performance indicators include parameters selected from the group consisting of unusually high CPU usage, low available working memory, and slow response of specific applications. In an exemplary embodiment of the disclosure, the changes are collected continuously from computer stations of the system and stored in a database. Optionally, the risk profile is estimated based on a ratio of incidents per number of changes performed for a specific configuration item. Alternatively or additionally, the risk profile is estimated based on a ratio of incidents per number of changes performed for an IT action comprising a group of configuration items that were changed together. Further alternatively or additionally, the risk profile is estimated based on a type of the configuration item and/or system parameters that changed. Further alternatively or additionally, the risk profile is estimated based on an incident rate distribution that defines a probability as a function of time for the occurrence of an incident due to the changed configuration item and/or system parameters. In an exemplary embodiment of the disclosure, a Weibull distribution is used for the probability function.

There is further provided according to an exemplary embodiment of the disclosure, a non-transitory computer readable medium for storing program code to execute the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
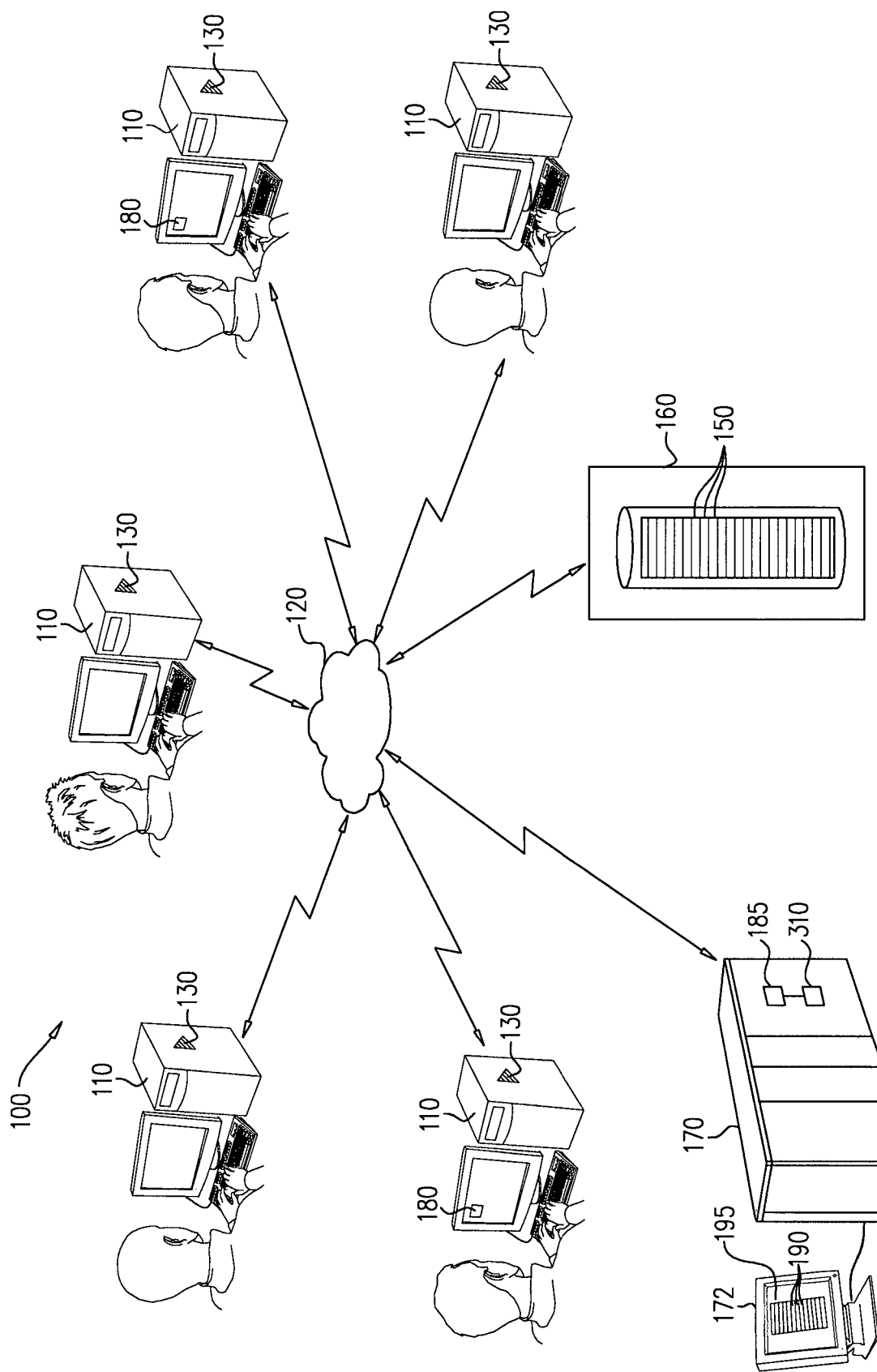
FIG. 1 is a schematic illustration of a network of computers connected in an information technology system, according to an exemplary embodiment of the disclosure.

FIG. 1 is a schematic illustration of a network of computers connected in an information technology system 100, according to an exemplary embodiment of the disclosure. In an exemplary embodiment of the disclosure, IT system 100 includes multiple stations 110 connected over a network 120. Optionally, each station 110 may serve as a workstation for accessing servers or may be a server for providing services to users of workstations. Network 120 may be a local area network (LAN), a wide area network (WAN) (e.g. the Internet) or any other type of network over which stations 110 may communicate. Optionally, each station 110 executes an agent application 130 for monitoring and collecting information at the station 110. The collected information includes configuration items and/or system parameters 150 relating to the hardware and software installed in the stations 110 of IT system 100. Optionally, the configuration items and/or system parameters 150 may be collected periodically or upon occurrence of a change to the configuration items and/or system parameters 150. In some embodiments of the disclosure, the configuration items and/or system parameters 150 may be only collected on specific stations 110, for example only on servers or only on specific servers that have an important role in IT system 100.

In an exemplary embodiment of the disclosure, agent application 130 may also include application performance monitoring (APM) tools to monitor key performance indicators (KPIs) on the station 110. Optionally, the APM tools trigger an alert whenever one or more KPIs reach a critical level or correspond to an abnormal value. A typical problematic incident may be manifest by degraded user experience such as increased transaction execution time, high CPU load, network congestion low available working memory or the like. The triggered alerts are not the cause of the problem but rather provide an indication that particular KPIs are not in an expected range and can be treated as symptoms to identify potential incidents within IT system 100. In an exemplary embodiment of the disclosure, the root cause of an incident is one or more of the following:

a. a change in system input;
 b. hardware failure; or
 c. a change in system parameters or configuration items.

In an exemplary embodiment of the disclosure, a method with the required apparatus will be described to establish a causal correlation between symptoms and changes 190 of configuration items and/or system parameters 150 or other changes, which serve as the root causes of incidents. Optionally, once hardware failure and/or a specific input are ruled out as the cause of a failure, system 100 will be able to pinpoint the changes 190 that serve as the root cause of the incident. In an exemplary embodiment of the disclosure, the correlation is established based on the timestamp, risk profile and other characteristics of the changes 190. When an incident happens, the proposed solution estimates and finds the most probable changes 190 causing the symptoms indicating an incident. So that instead of analyzing all the changes that happened in system 100 before the symptom, analysis can be limited only to the most correlated data sources in system 100, which are most probably the root cause of the incident in system 100. This method can significantly reduce the amount of time required to review and identify the most likely root cause.

In an exemplary embodiment of the disclosure, the information collected by agent application 130 is stored in a database 160. Optionally, an agent server 170 uses an analysis program 185 for processing the collected information and analyzing it to identify the most probable changes 190. In an exemplary embodiment of the disclosure, the user (e.g. the IT administrator) is provided (e.g. on a display 172 or printed hardcopy) with a list 195 of the most probable changes 190 that were detected.

In an exemplary embodiment of the disclosure, a change is the result of a change in a configuration item and/or system parameter 150 at two different times, for example if the value of the configuration item and/or system parameters 150 is changed, if the item didn't exist before and was newly created or if the item existed before and was deleted. Optionally, a change is the result of a change in source code, data, workload, network load and data. Optionally, a change 190 may have numerous characteristics associated therewith, for example:

1. The host computer on which the change occurred and hardware specifications.
 2. The environment (e.g. operating system or other programs executed on the host).
 3. The values of the configuration items (CI) and/or system parameters 150 before and after the change.
 4. The timestamp of the occurrence of the change.
 5. The change type—what kind of artifact was changed, for example is the change 190 is in the type of input, in configuration item content or parameters values, capacity parameters (e.g. a buffer size), workload, network load, code (e.g. a program was changed) and the like.
 6. Risk profile—how likely a change 190 will cause an incident—optionally, an estimate based on the ratio of incidents per number of changes performed to a specific configuration item and/or system parameter 150 or to an IT action that includes a group of configuration items and/or system parameters 150, for example a Windows update. The risk profile can be pre-defined using domain specific knowledge, e.g. updates of basic OS components have a lower risk profile than changes to database capacity parameters. Alternatively, the risk profile can be defined using statistics about same or similar changes (previous cases that were analyzed). Optionally, the risk profile may be a numeric value or a general value such as low, medium, high.
 7. Incident rate distribution—in case a change can cause an incident, what is the expected time delay between the time the change was introduced and the time the incident can occur (immediately, random, delayed). Optionally, this parameter may be defined as a probability function as a function of time. In some embodiment of the disclosure, the following values may be used:
  a. infant mortality for an incident that will most likely occur immediately after the change occurs or after a short time delay;
  b. random mortality for an incident that is expected to occur any time after the change occurs;
  c. aging mortality for an incident that will mostly follow after a long time delay, for example after a few days or months (e.g. if a change causes a buffer to slowly fill up and overflow);

Optionally, the probability distribution may be represented by a Weibull distribution although other statistical distributions may be used.

8. Change lifetime—The lifetime a change is considered to be able to affect system 100 (forever, immediate, a few days or other time spans). Optionally, after the change lifetime passes the likelihood of the change to cause an incident is insignificant.

Figure 2:
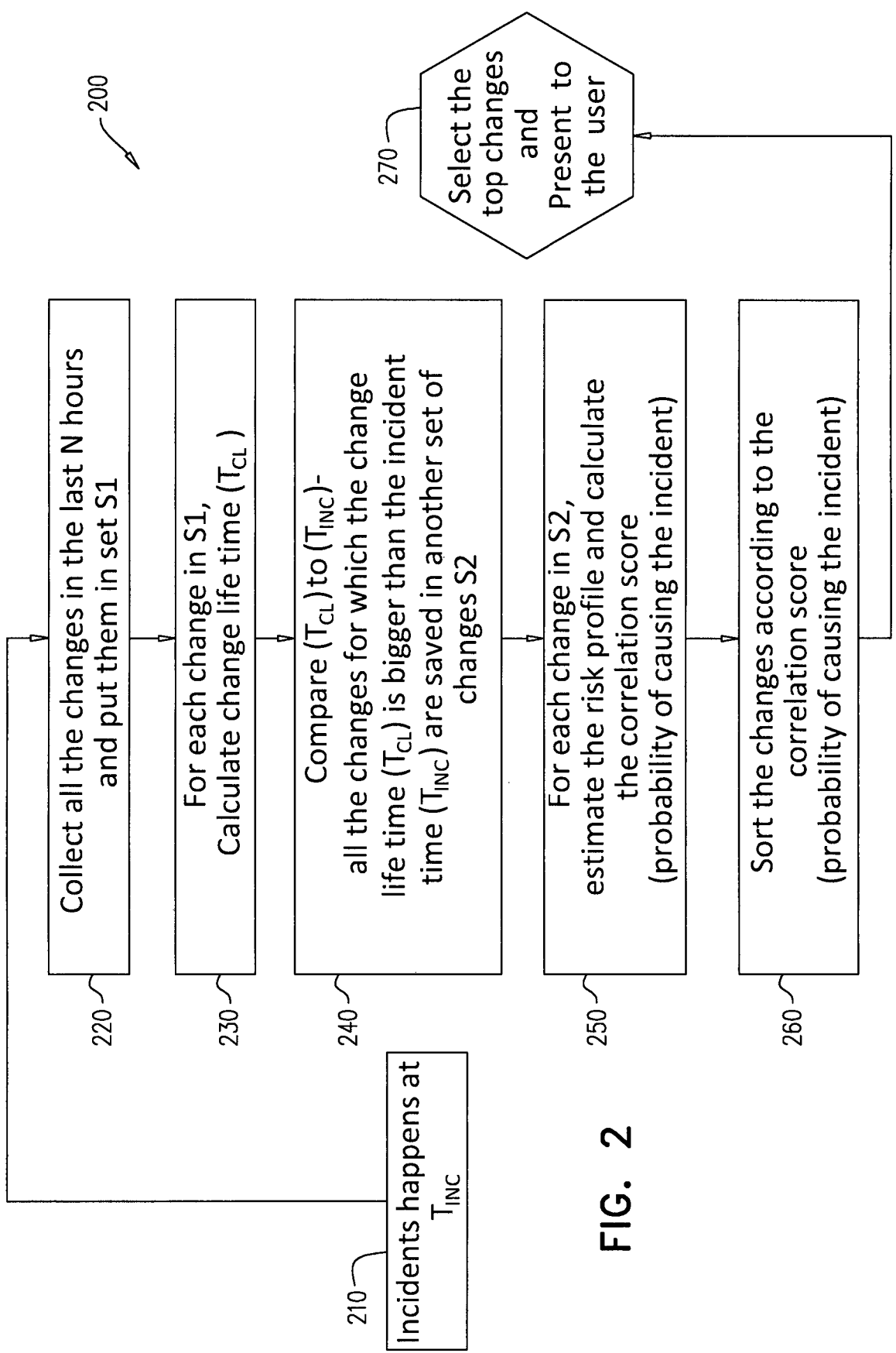
FIG. 2 is a flow diagram of a method of incident root cause analysis, according to an exemplary embodiment of the disclosure.
Figure 3:
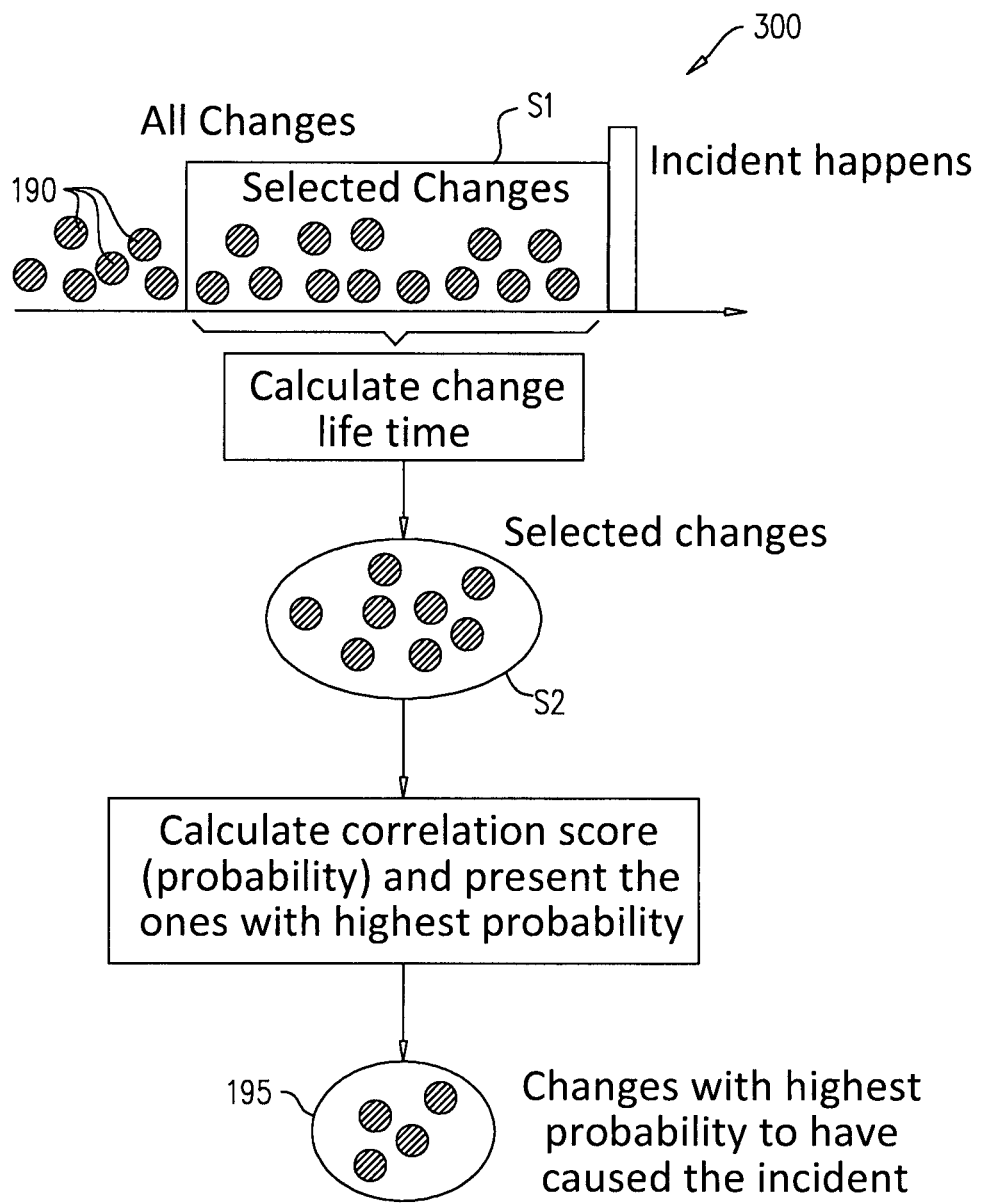
FIG. 3 is a graphical illustration of a method of incident root cause analysis, according to an exemplary embodiment of the disclosure.

FIG. 2 is a flow diagram of a method 200 of incident root cause analysis and FIG. 3 is a graphical representation 300 of the method of incident root cause analysis, according to an exemplary embodiment of the disclosure. In an exemplary embodiment of the disclosure, when an incident occurs (210) at time $T_{inc}$, analysis program 185 on agent server 170 collects (220) all the changes 190 that occurred during the last N hours (or days or other time interval) from database 160 or from agent applications 130 and forms a set S1. Optionally, for each change 190 in set S1 agent server 170 calculates (230) a life time value $T_{cl}$. Server 170 compares (240) change life time value $T_{cl}$ with the time $T_{inc}$ to determine if the change expired or if it could affect the incident manifested at time $T_{inc}$.

In an exemplary embodiment of the disclosure, the changes that could affect the incident ($T_{cl} > T_{inc}$) are grouped in a subset S2. Then, for each change in subset S2 a risk profile is estimated (250) based on the other characteristics associated with the change 190 providing a probability distribution f(t) for the particular change. Optionally, a correlation score is calculated, the correlation score representing the probability that the change 190 caused the incident. Expired changes are given a correlation score of zero.

In an exemplary embodiment of the disclosure, the correlation score is calculated by:

1. A probability of an incident happening for each change. Optionally, a multi-dimensional analysis can be used to estimate the likelihood of an incident for the change. This value may be set by an expert or based on an actual occurrence. Optionally, if the likelihood is high, then the likelihood incident may be set e.g. to 1 in 50, if the likelihood is in the middle, then the likelihood incident may be set e.g. to 1 in 1000, if the likelihood is low, then the likelihood incident may be set e.g. to 1 in 10000.

2. Conditional probability that a change will cause an incident at time $T_{INC}$ given it will eventually cause an incident. An incident rate distribution for a particular change type, wherein each change is classified according to the type of change (e.g. code, data, capacity, and configuration) it belongs to. Each type is associated with an incident rate that it could exhibit, for example infant, random, aging mortality (e.g. capacity will generally follow aging mortality whereas code follows random). The incident rate distribution could be modeled, for example, with the Weibull distribution mentioned above, whereas the actual distribution and distribution parameters may be based on actual data or set by an expert. Probability that an incident will be manifested by time $T_{INC}$ is calculated by integrating the probability distribution for the particular change 190 from the start time when the change has happened up to the time when the incident was manifested as an alert, i.e., $T_{INC}$.

$$\int_0^{T_{INC}} f(t)dt$$

The correlation score is then calculated by multiplying probability of an incident with the conditional probability that a change will cause an incident by time $T_{INC}$ given it will eventually cause an incident. In an exemplary embodiment of the disclosure, the parameters for incident rate distribution are stored in a database and the probability of an incident is computed dynamically in real time for each change. When needed both values are combined to calculate the change probability.

For example, when a new application is deployed, a large number of changes (e.g. 1000 or more) are introduced to system 100. Some of the changes are related to web server configuration, others to database server, while most of them to source code. Optionally, each change is classified into a particular change type associated with a corresponding incident rate distribution. Further, each change is associated with a particular risk profile as not all changes are equally important. Ultimately, each change is assigned with its own combination of risk profile, incident rate distribution, change lifetime etc. thus providing a unique correlation score indicating a likelihood that particular changes caused the incident. Optionally, incident rate distribution could be assigned based on an IT action according to the IT Action type and risk profile aggregated from the changes introduced by the IT action, thus providing an IT action lifetime and a likelihood that the particular set of changes is the most likely root cause.

In an exemplary embodiment of the disclosure, the changes 190 are sorted (260) based on the correlation score to identify the top scoring changes 190. Optionally, a preselected number of changes (K) are selected and presented (270) as a list 195 to the user as the most likely changes to have caused the incident. In some embodiments of the disclosure, K is defined empirically based on previous successful use of the method.

Figure 4:
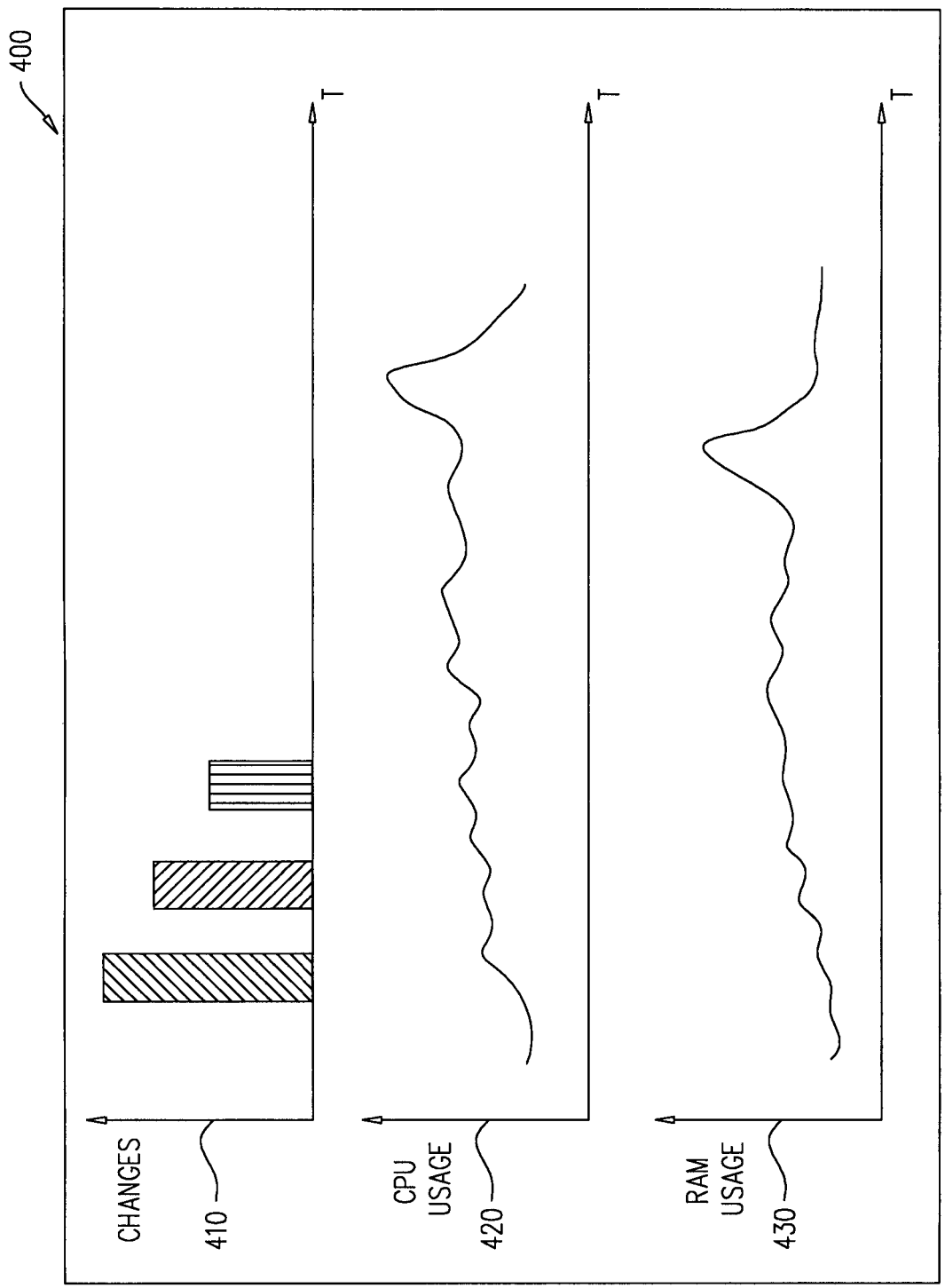
FIG. 4 is a visual display showing changes on a timeline relative to system performance parameters, according to an exemplary embodiment of the disclosure.

FIG. 4 is a visual display 400 showing changes on a timeline relative to system performance parameters (420, 430), according to an exemplary embodiment of the disclosure. Optionally, visual display 400 may show (e.g. on display 172 of server 170) in real-time or as a summary after an incident, an accumulation of changes 410 as a function of time. Optionally, the height may represent the number of changes and the changes may be marked with different colors or patterns to indicate a level of likelihood (e.g. probability) that the changes at a specific time are affecting performance. In an exemplary embodiment of the disclosure, the visual display 400 may also show the measurements of application performance monitoring (APM) tools (e.g. CPU usage 420, RAM usage 430 and/or other system parameters as a function of time) to visualize incidents.

In an exemplary embodiment of the disclosure, the stations 110 may be any type of general purpose computer. Optionally, they may be standard desktop computers, dedicated server computers, rack mount computers, laptop computers, mobile devices or any other type of computational device having a processor and memory.

In an exemplary embodiment of the disclosure, analysis program 185 may be transferred on a non-transitory computer readable medium for storing program code to agent server 170. Optionally, the medium includes a CD, DVD, diskonkey, USB drive, magnetic media, optical media or other types of media.

In an exemplary embodiment of the disclosure, agent application 130 is provided with a list of application definitions specifying what to collect and how, for example to track changes in all files in a specific directory, track changes in registry entries or collect the values of specific entries in a database.

In some embodiments of the disclosure, instead of installing a dedicated agent application 130, the information is collected by standard API applications that are executed by the local operating system on the station 110 responsive to a request from agent server 170 or from other computer stations 110. Optionally, agent server 170 polls the stations 110 to extract the information instead of extracting the information directly from database 160, and then agent server 170 stores the information in database 160.

The configuration items and/or system parameters 150 may include hardware details of the station 110, for example the amount of RAM, processor model, disk size, and models of devices attached. Optionally, the configuration items and/or system parameters 150 may include firmware details, such as BIOS version, BIOS size and a checksum (e.g. CRC). Alternatively or additionally, the configuration parameters and/or system parameters 150 may include details of application software installed on the station 110, including meta-data (e.g. when installed and by whom) and application data.

The applications may include operating systems, client server applications, database applications, or corporate applications used by a corporation to support the corporate activity, for example the applications may include SQL servers and web servers.

In an exemplary embodiment of the disclosure, configuration items and/or system parameters 150 of the applications may include: application identity, application version, date of installation, name of the user that installed the application, updates installed, drivers installed, names and sizes of files belonging to each application, values of controllable parameters for configuring applications, file sizes, file checksums, registry content, available RAM, available disk space and any other information for identifying the status or affect of the software installed on the stations 110. Optionally, the number of recorded configuration items and/or system parameters 150 dealt with by IT system 100 may be between 10 to 100, 100 to 1000, 1000 to 10000, 10000 to 100000 or more.

In some embodiments of the disclosure, agent application 130 may be installed on one or more stations 110 that are not connected together over a network, for example at different organizations/clients. Optionally, the information may be stored locally and collected for example using an external disk, diskonkey or by temporarily connecting the station to a wide area network such as the Internet and transmitting the information to database 160. In an exemplary embodiment of the disclosure, agent server 170 can be used to examine installations of applications at different organizations/clients, to debug applications or resolve problems in installations.

In an exemplary embodiment of the disclosure, agent server 170 clusters granular changes of configuration items and/or system parameters 150 into higher level objects, namely IT actions so that the analysis is applied to a much shorter list of items. Optionally, each IT action includes tens, hundreds or thousands of configuration items thus reducing the amount of information being processed.

In an exemplary embodiment of the disclosure, an IT action corresponds to actual events in the IT system 100. A typical example of an IT action is a Windows Update event. When this event happens, it may make hundreds of changes to the system (change, delete, create, update files). All these changes are recorded as separate granular changes at particular configuration items.

In some embodiments of the disclosure, agent server 170 may be activated continuously as a member of IT system 100 or agent server 170 may be activated periodically (e.g. every hour, every day, every week) to verify correctness of IT system 100 and/or verify correctness of changes occurring in IT system 100.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

We claim:

1. A method of incident root cause analysis in an information technology (TT) system, comprising:
    upon occurrence of an incident in the information technology, system:
    collecting changes to configuration items and/or system parameters on computer stations in the information technology system during a predetermined time prior to the incident;
    calculating by an analysis server, a change lifetime value for each of the collected changes;
    comparing the change lifetime value to the time of occurrence of the incident to determine if the lifetime of the change lifetime value is still valid or has expired;
    marking a probability value of zero for occurrence of the incident as a result of the change for changes with an expired change lifetime value at the time of occurrence of the incident;
    estimating a risk profile and calculating from it a probability value for occurrence of the incident as a result of the change for changes with a change lifetime value that is still valid at the time of the incident;
    wherein the risk profile is estimated based on an incident rate distribution that defines a probability function over time from the time of change and the probability value is calculated by integrating the probability function from the time of change to the time of the incident;
    wherein the incident rate distribution for a particular change is classified according to 1) a setting by an expert or based on an actual occurrence, and 2) the type of change it belongs to, wherein each type is associated with an incident rate that it could exhibit; wherein said types include code, data, capacity and configuration;
    sorting the changes according to the probability value;
    selecting a predetermined number of changes having the highest probability values for root cause analysis;
    wherein the analysis server debugs applications or resolves problems in installations or updates based on the changes having the highest probability values.

2. The method of claim 1, wherein key performance indicators in the information technology system are monitored by agents installed on computer stations of the system to trigger an incident.

3. The method of claim 2, wherein the key performance indicators include parameters selected from the group consisting of unusually high CPU usage, low available working memory, disk space, transaction slowdowns or errors, network congestion and slow response time for specific applications.

4. The method of claim 1, wherein changes are collected continuously from computer stations of the system and stored in a database.

5. The method of claim 1, wherein the risk profile is estimated based on a ratio of incidents per number of changes performed.

6. The method of claim 1, wherein the risk profile is estimated based on a ratio of incidents per number of changes performed for an IT action comprising a group of configuration items and/or system parameters that were changed together.

7. The method of claim 1, wherein the risk profile is estimated based on a type of the configuration item and/or system parameters that changed or based on multi-dimensional risk analysis using change properties comprising frequency of change, if change was authorized, or if the change is consistent across different environments.

8. The method of claim 1, wherein a Weibull distribution is used for the probability function.

9. The method of claim 8, wherein the parameters for applying the Weibull distribution are based on actual prior data.

10. A system for incident root cause analysis in an information technology (IT) system, comprising:
    a database for storing changes to configuration items and/or changed system parameters;
    a computer having a processor and memory serving as an analysis server;
    an analysis program executed by the analysis server computer;

wherein upon occurrence of an incident in the information technology system the analysis program is programed to perform the following:

collecting changes to configuration items and/or system parameters on computer stations in the information technology system during a predetermined time prior to the incident;

calculating a change lifetime value for each of the collected changes;

comparing the change lifetime value to the time of occurrence of the incident to determine if the lifetime of the change lifetime value is still valid or has expired;

marking a probability value of zero for occurrence of the incident as a result of the change for changes with an expired change lifetime value at the time of the incident;

estimating a risk profile and calculating from it a probability value for occurrence of the incident as a result of the change for changes with a change lifetime value that is still valid at the time of the incident;

wherein the risk profile is estimated based on an incident rate distribution that defines a probability function over time from the time of change and the probability value is calculated by integrating the probability function from the time of change to the time of the incident;

wherein the incident rate distribution for a particular change is classified according to 1) a setting by an expert or based on an actual occurrence, and 2) the type of change it belongs to, wherein each type is associated with an incident rate that it could exhibit; wherein said types include code, data, capacity and configuration;

sorting the changes according to the probability value;

selecting a predetermined number of changes having the highest probability values for root cause analysis;

wherein the analysis server debugs applications or resolves problems in installations or updates based on the changes having the highest probability values.

11. The system of claim 10, wherein key performance indicators in the information technology system are monitored by agents installed on computer stations of the system to trigger an incident alert.

12. The system of claim 11, wherein the key performance indicators include parameters selected from the group consisting of unusually high CPU usage, low available working memory, and slow response of specific applications.

13. The system of claim 10, wherein changes are collected continuously from computer stations of the system and stored in a database.

14. The system of claim 10, wherein the risk profile is estimated based on a ratio of incidents per number of changes performed for a specific configuration item and/or system parameter.

15. The system of claim 10, wherein the risk profile is estimated based on a ratio of incidents per number of changes performed for an IT action comprising a group of configuration items and/or system parameters that were changed together.

16. The system of claim 10, wherein the risk profile is estimated based on a type of the configuration item and/or system parameter that changed.

17. The system of claim 10, wherein a Weibull distribution is used for the probability function.

18. The system of claim 17, wherein the parameters for applying the Weibull distribution are based on actual prior data.

19. A non-transitory computer readable medium for storing program code to execute the method according to claim 1.

* * * * *